US006633985B2

(12) United States Patent
Drell (10) Patent No.: US 6,633,985 B2
(45) Date of Patent: Oct. 14, 2003

(54) SYSTEM AND METHOD FOR VIDEOCONFERENCING ACROSS NETWORKS SEPARATED BY A FIREWALL (75) Inventor: David Drell, Pleasanton, CA (US)

(73) Assignee: Polycom, Inc., Pleasanton, CA (US)

(*) Notice: Subject to any disclaimer, the term of this patent is extended or adjusted under 35 U.S.C. 154(b) by 0 days.

(21) Appl. No.: 10/364,963

(22) Filed: Feb. 11, 2003

(65) Prior Publication Data
US 2003/0154410 A1 Aug. 14, 2003

Related U.S. Application Data
(60) Provisional application No. 60/356,227, filed on Feb. 11, 2002.

(51) Int. Cl.[7] .............................................. G06F 1/24
(52) U.S. Cl. ..................... 713/201; 713/161; 713/165; 713/168
(58) Field of Search ............................... 713/201, 161, 713/165, 166, 168

(56) References Cited

U.S. PATENT DOCUMENTS 6,304,967 B1 * 10/2001 Braddy ....................... 713/150
6,321,267 B1 * 11/2001 Donaldson .................. 709/229
6,324,648 B1 * 11/2001 Grantges, Jr. ............... 713/201

* cited by examiner

Primary Examiner—Thomas R. Peeso
(74) Attorney, Agent, or Firm—Wong, Cabello, Lutsch, Rutherford & Brucculeri L.L.P.

(57) ABSTRACT

A multimedia firewall adapter supplements a conventional firewall to allow transmission of videoconferencing data (e.g., audio and video data) associated with a protocol, such as the H.323 protocol. The multimedia firewall adapter supplements the conventional firewall so that audio and video data associated with the H.323 protocol are allowed to pass through the multimedia firewall adapter, thus circumventing the conventional firewall. The multimedia firewall adapter receives signals from an intranet and Internet, decomposes the signals, and attempts to authenticate the decomposed signals according to the H.323 protocol. If the decomposed signals are authenticated to contain videoconferencing data, the multimedia firewall adapter negotiates and establishes a connection, and allows the videoconferencing data to pass through. However, if the signal is not authenticated, then the signal is blocked from passing. The blocked signal is redirected to the conventional firewall for analysis.

35 Claims, 8 Drawing Sheets

SYSTEM AND METHOD FOR VIDEOCONFERENCING ACROSS NETWORKS SEPARATED BY A FIREWALL

CROSS REFERENCE TO RELATED APPLICATION

This application claims the benefit of Provisional Patent Application Serial No. 60/356,227, filed Feb. 11, 2002, entitled "System and Method for Videoconferencing Across a Firewall," which is incorporated herein by reference.

BACKGROUND OF THE INVENTION

1. Field of the Invention

The present invention relates generally to videoconferencing, and more particularly to videoconferencing across networks separated by a firewall.

2. Description of Related Art

Security is a major concern for people and companies using the Internet. Security systems that prevent unauthorized people from entering an Internet site and causing damage are constantly being developed, implemented, and, inevitably, circumvented.

Developing security measures is a complicated and tricky business because Internet security systems must be secure enough to keep out trespassers while at the same time allowing legitimate users easy access. Since high security systems require more checks and verification than do lower security systems, it is typically more difficult to use a system with security features than one without security features. Additionally, highly secured systems are more limiting than unsecured systems because these systems restrict the types of activities allowed in order to increase the security.

Figure 1:
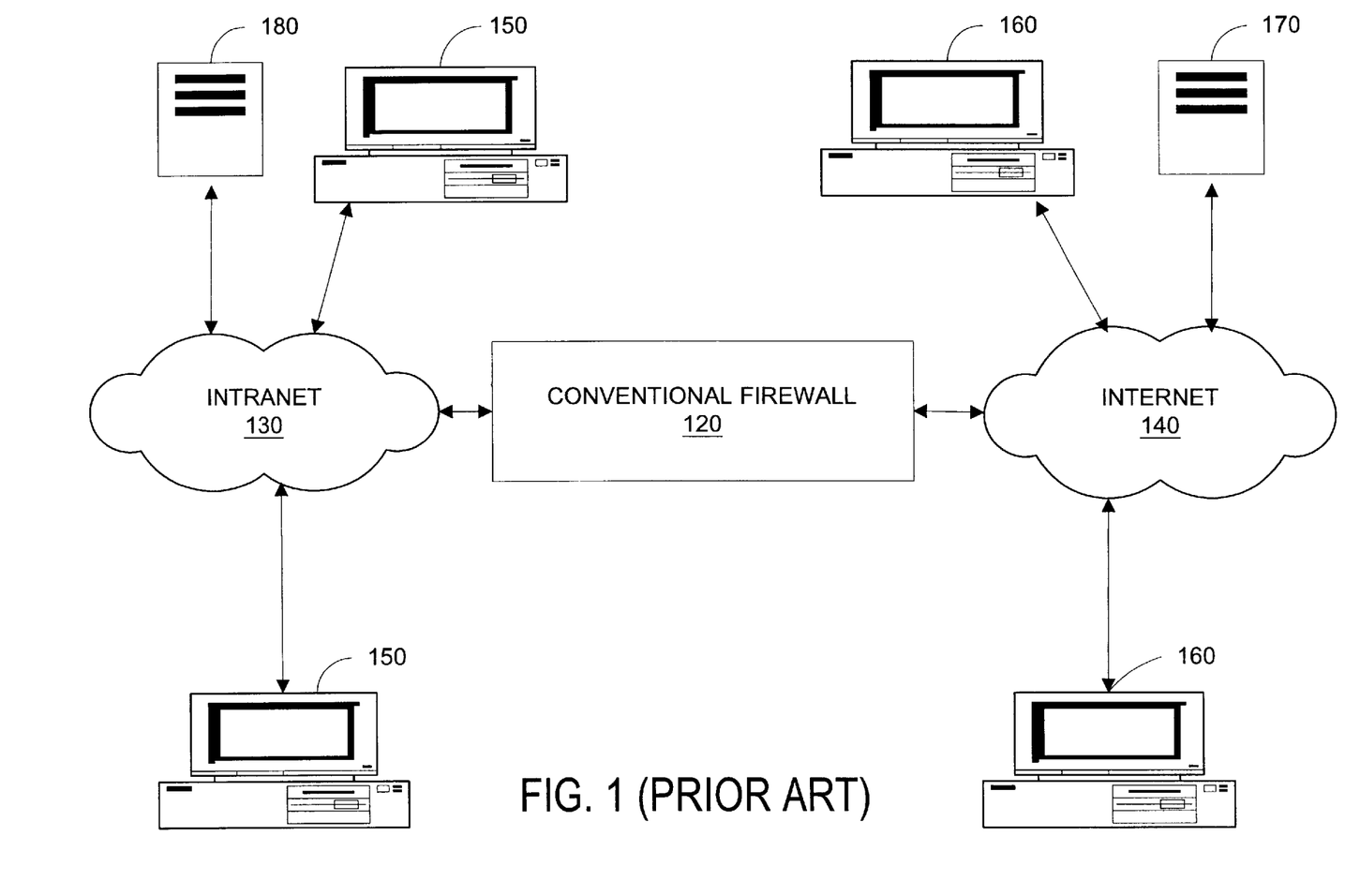
FIG. 1 is a prior art diagram of a firewall separating an intranet from an Internet.

Typically, firewalls are used by companies to protect their intranet from outside intruders because the firewalls provide a reasonable level of security while, at the same time, not being too difficult and limiting to use. Firewalls are widely used by companies to give employees access to the Internet in a secure fashion as well as to separate a company's public Web server from its internal network. Typically, the firewall is placed between a company's intranet servers and internal computing resources and its publicly accessible websites, as illustrated in FIG. 1. FIG. 1 shows an intranet 130 having internal computers 150 and an intranet server 180 separated by a conventional firewall 120 from a public Internet 140 having external computers 160 and a web server 170. In order to increase security, the conventional firewall 120 limits the type of access allowed to users. For example, the conventional firewall 120 allows certain types of IP packets to pass through while limiting other types of IP packets.

Restrictions imposed by the conventional firewall 120 may limit users so that they cannot access all parts of the Internet 140 and therefore make full use of the Internet 140. For example, some videoconferences cannot be setup across the conventional firewall 120 because conventional firewalls are designed to only work with very specific protocols which are not compatible with newer videoconferencing techniques. Further, newer videoconferencing techniques using an H.323 protocol, which is an ITU standard for real time, interactive voice and videoconferencing over Local Area Networks (LANs) and the Internet, may not be recognized by the conventional firewall 120 and, consequently, not allowed through the convention firewall 120. Alternatively, some conventional firewalls 120 do support H.323, but typically drop packets and have low throughput because these conventional firewalls 120 do not distinguish priority requirements of voice and video data. These conventional firewalls 120 also are not designed to handle loads for real-time voice and video traffic.

Although a limitation of only permitting H.320 protocols in videoconferencing achieves design goals of enhancing a firewall's security, the limitation also restricts an intranet user's access to the Internet 140. If the firewall implementation includes network address translation using the H.323 protocol for videoconferencing, the implementation cannot penetrate the conventional firewall 120. For example, having the destination party's address embedded in the IP packet makes it impossible to decode with the H.323 protocol used by the conventional firewall 120.

Since many videoconferencing techniques use the H.323 protocol, conducting videoconferences has become very difficult for users that have the conventional firewall 120. This difficulty has resulted in slowing the growth of the videoconferencing market. Therefore, a system and method is needed for videoconferencing across networks separated by the conventional firewall 120, while preserving all security features provided by the conventional firewall 120.

SUMMARY OF THE INVENTION

In order to provide a system for videoconferencing across a conventional firewall, a multimedia firewall adapter may be used to supplement the conventional firewall or may be integrated into the conventional firewall forming a new firewall that functions as a stand-alone unit.

The multimedia firewall adapter may supplement the conventional firewall by running in parallel with the conventional firewall so that signals addressed to videoconferencing systems are routed to the multimedia firewall adapter instead of to the conventional firewall. In one embodiment, the multimedia firewall adapter attempts to decompose and authenticate incoming signals according to an H.323 protocol. Alternatively, other protocols may be used or contemplated for use in the present invention. If the incoming decomposed signal is authenticated to contain videoconferencing data, such as video, audio, T.120, or configuration data, then the multimedia firewall adapter negotiates and establishes a connection across the multimedia firewall adapter between a caller and a call recipient, and allows the videoconferencing data to go through, thus circumventing the conventional firewall. If, on the other hand, the incoming signal is not authenticated to contain videoconferencing data, then the multimedia firewall adapter does not pass the incoming signal. In addition, signals which are blocked from passing through the multimedia firewall adapter are presumed to be non-video/audio signals, and are subsequently routed to the conventional firewall, which analyzes the signals to determine if Internet Protocol (IP) data packets comprising the signals are authorized to pass through. If the IP packets are unauthorized, then they are rejected by the conventional firewall. Conversely, authorized IP packets are allowed to pass through the conventional firewall.

The multimedia firewall adapter allows for massive amounts of video and audio data of the videoconference to circumvent the conventional firewall without compromising the security of a secured site, and without slowing down the data transfer. For example, once the multimedia firewall adapter determines that the decomposed incoming signal contains video and audio data, the multimedia firewall adapter allows the video and audio data to pass through on dedicated data channels without having to further check content. There is no need to check the content of authenticated video and audio data because this data is transferred and broadcast without processing. Since video and audio data are not processed in the same way conventional IP packets are processed, video and audio IP packets containing dangerous and damaging instructions will have no effect on a secured and private network, such as an intranet. These and other benefits and advantages of the invention will become more apparent upon reading the following Detailed Description with reference to the drawings.

DETAILED DESCRIPTION OF EXEMPLARY EMBODIMENTS

Figure 2:
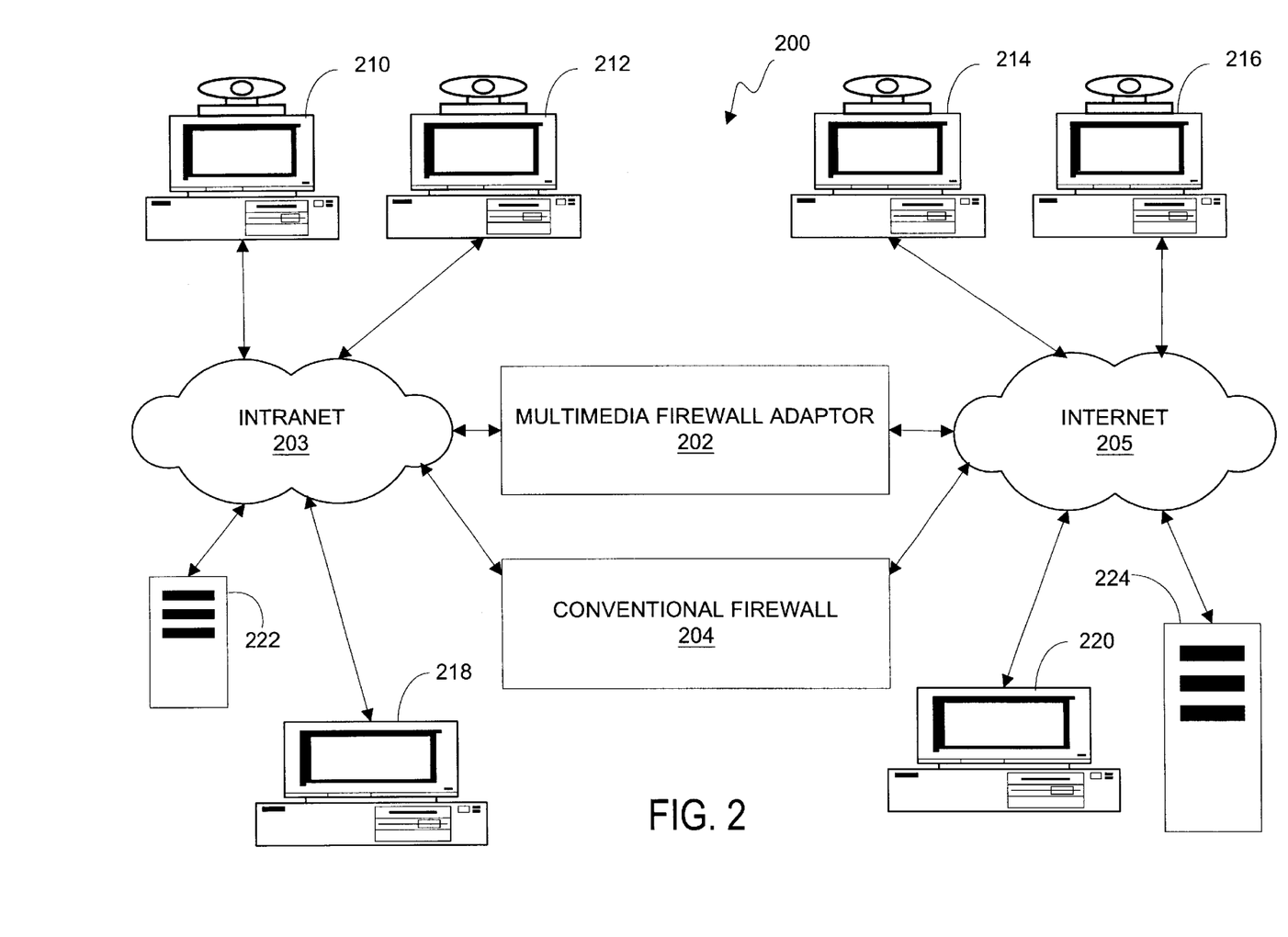
FIG. 2 is an exemplary block diagram of a network including a multimedia firewall adapter.

FIG. 2 shows a network 200 that uses a multimedia firewall adapter 202, wherein the network 200 comprises a conventional firewall 204, an intranet 203, an Internet 205, videoconferencing systems 210, 212, 214, and 216, personal computers 218 and 220, and web servers 222 and 224. The multimedia firewall adapter 202 supports and manages flow of audio and video data traffic between the Internet 205 and the intranet 203. The intranet 203 is an in-house website that serves employees of an enterprise and has restricted access by the general public, whereas the Internet 205 is a large network made up of a number of smaller networks that can be accessed by the general public. The conventional firewall 204 is commonly used to separate the intranet 203 from the Internet 205, thus preventing unauthorized Internet 205 users from entering the intranet 203 while at the same time allowing authorized users to communicate across the conventional firewall 204. The videoconferencing systems 210, 212, 214, and 216 are devices, such as a Polycom ViewStation® manufactured by Polycom Inc., that collect, transmit, and receive video and audio images through the Internet 205, ISDN (not shown), or other communication means. While FIG. 2 shows a specific embodiment of the network 200, those skilled in the art will recognize that differing numbers of computers, servers, and videoconferencing systems may be utilized within the network 200.

The conventional firewall 204 is designed to prevent unauthorized IP packets from entering the intranet 203. This security measure can be a problem for videoconference systems that reside on different sides of the conventional firewall 204 because the conventional firewall 204 is designed to restrict the flow of IP packets whereas videoconference systems, typically, wish to transfer substantial amounts of data in the form of IP packets across the conventional firewall 204. Further, by checking all incoming IP packets, the conventional firewall 204 reduces bandwidth available for transferring data between the intranet 203 and the Internet 205.

The multimedia firewall adapter 202 solves the bandwidth problem by acting as a gateway which decomposes incoming videoconferencing signals, transfers the decomposed data across the multimedia firewall adapter 202, and then reconstructs the data on the other side of the multimedia firewall adapter 202. In an exemplary embodiment, addressing schemes such as user@video.company.com, would send the signal directly to the multimedia firewall adapter 202, because the "video" in the address indicates that the signal contains videoconferencing data. Alternatively, all normal data would be sent to the conventional firewall 204. This process allows the videoconferencing signals to effectively circumvent the conventional firewall 204 because only raw data instead of IP packets are transferred across the multimedia firewall adapter 202. Since the raw data is filtered, according to a protocol, before it is transferred across the multimedia firewall adapter 202, security is not compromised. In essence, the multimedia firewall adapter 202 restores the bandwidth which is taken away by the security features of the conventional firewall 204 without significantly sacrificing any of the security features provided for by the conventional firewall 204.

The multimedia firewall adapter 202 is designed to supplement and expand the existing capabilities of the conventional firewall 204 so videoconferencing may be utilized in the network 200. By designing the multimedia firewall adapter 202 to supplement the existing conventional firewall 204, an existing system can be upgraded rather than replaced, thus reducing costs to consumers. This feature is very attractive to consumers because most users of the multimedia firewall adapter 202 will already have the conventional firewall 204 in place. In fact there is no need for the multimedia firewall adapter 202 without the existence of the conventional firewall 204, because the multimedia ,firewall adapter 202 is designed to compensate for the strict security features of the conventional firewall 204. In an alternative embodiment, a fully integrated multimedia firewall adapter (not shown) can be purchased with both the conventional firewall 204 and the multimedia firewall adapter 202 capabilities built in.

The videoconferencing systems 210 and 212 residing on the intranet 203 side of the conventional firewall 204 can communicate with each other through the intranet 203, avoiding the use of the conventional firewall 204 and the multimedia firewall adapter 202. Similarly, videoconferencing systems 214 and 216 residing on the Internet 205 side of the conventional firewall 204 can communicate with each other through the Internet 205, and also avoid the use of the convention firewall 204 and the multimedia firewall adapter 202.

However, when the videoconferencing systems 210 or 212 wish to interact with the videoconferencing systems 214 or 216, the videoconferencing system 210 or 212 must use the multimedia firewall adapter 202 to pass data through to the Internet 205. For example, if an internal conference caller using the videoconference system 210 wants to initiate a videoconference with an external conference recipient at the videoconferencing system 214, the internal conference participant must first connect to the intranet 203. The intranet 203, subsequently connects to the multimedia firewall adapter 202. Because the conventional firewall 204 would be unable to negotiate a path for the video and audio data of the videoconference, the multimedia firewall adapter 202 is required to negotiate this path connecting the intranet 203 to the Internet 205. The multimedia firewall adapter 202 thus preserves the security of the intranet 203, while allowing massive amounts of data found in audio and video streams of the videoconference to pass through. Finally, a connection between the Internet 205 and the external videoconferencing system 214 is established. In a further embodiment, it may be necessary to access the web server 224 residing on the Internet 205 side of the conventional firewall 204 in order to retrieve information such as destination party addresses if a gatekeeper (which will be discussed in more detail in connection with FIG. 4) resides on the web server 224.

In alternative embodiments, the multimedia firewall adapter 202 can be placed between the videoconferencing systems 210, 212 and the intranet 203, the videoconferencing systems 214, 216 and the Internet 205, the computer 218 and the intranet 203, and the computer 220 and the Internet 205. These alternative embodiments are particularly useful in situations where the conventional firewall 204 is configured to prevent passage of specifically identified data streams and permit the passage of all other data streams, including audio and video data. In one exemplary alternative embodiment, the multimedia firewall adapter 202 could be built into the computers 218 and 220 or used as a stand-alone unit. (The word "unit" in this specification is generic to hardware, software and combinations of both). This embodiment would allow outside users to access a company's intranet 203 or a portion of the intranet 203 but not allow access to all the computers that are inside of the intranet 203. In these alternative embodiments, the functionality described previously remains the same but the location of the multimedia firewall adapter 202 is modified.

Figure 3:
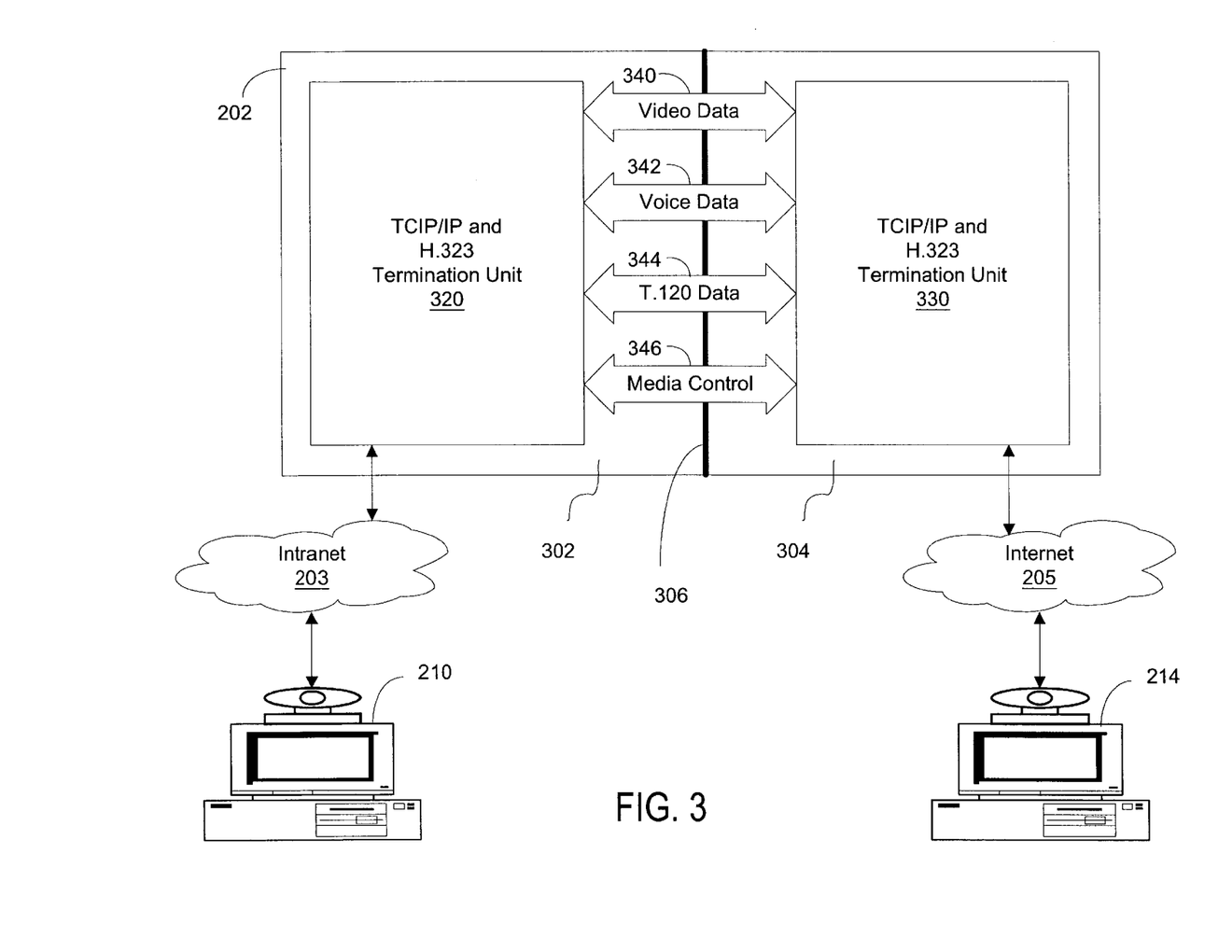
FIG. 3 is an exemplary block diagram showing elements of the multimedia firewall adapter of FIG. 2 in accordance with one embodiment of the invention.

FIG. 3 is a block diagram depicting an exemplary embodiment of the multimedia firewall adapter 202, which includes an inside multimedia firewall adapter unit 302 and an outside multimedia firewall adapter unit 304 separated at a divider 306. Although the divider 306 is drawn to emphasize separation between the intranet 203 side (i.e, inside multimedia firewall adapter unit 302) and the Internet 205 side (i.e., outside multimedia firewall adapter unit 304) of the multimedia firewall adapter 202, the divider 306 does not necessarily represent a real physical object and is primarily shown for illustrative purposes. The multimedia firewall adapter 202 further comprises a first Transmission Control Protocol/Internet Protocol (TCP/IP) and H.323 termination unit 320, a second TCP/IP and H.323 termination unit 330, a video data channel 340, a voice data channel 342, a T.120 data channel 344, and a media control channel 346. The first TCP/IP and H.323 termination unit 320 and the second TCP/IP and H.323 termination unit 330 are also referred to as a first TCP/IP and termination unit and a second TCP/IP and termination unit, respectively. The first and second TCP/IP and termination units may process signals received from the intranet 203 and the Internet 205 according to many videoconferencing protocols, such as Session Initiation Protocol (SIP), for example.

The first and second TCP/IP and H.323 termination units 320 and 330 receive signals from the intranet 203 and the Internet 205, respectively, analyze the signals, and decompose the signals into various data types. The details of the hardware and software used to decompose and analyze the signals is further described with reference to FIGS. 5, 6A, 6B and 7. The video data channel 340 is used to transfer video signals across the multimedia firewall adapter 202, while the voice data channel 342 is dedicated to transferring audio signals across the multimedia firewall adapter 202. Further, the T.120 data channel 344 transfers data conferencing signals as specified by the ITU T.120 standard, which is a standard for real time data conferencing (sharing data among multiple users). Alternatively, other standards maybe utilized. Finally, the media control channel 346 is used to transfer configuration, setup information, and call requests across the multimedia firewall adapter 202.

Incoming calls are received and terminated by the second TCP/IP and H.323 termination unit 330. All data packets, arriving from the Internet 205 are stopped by the second TCP/IP and H.323 termination unit 330 and decomposed according to the H.323 protocol before the data packets are allowed through to the intranet 203. Data which cannot be decomposed is either blocked or not presented to the multimedia firewall adapter 202. However, conventional data is forwarded to the conventional firewall 204 (FIG. 2) which checks the data and determines if the conventional data should be permitted to pass through the conventional firewall 204. Unauthorized data is then rejected at the conventional firewall 204. This process serves as a security measure because an incoming signal which is not a legitimate video or audio signal will not be decomposed correctly when the H.323 protocol is applied, thus preventing the multimedia firewall adapter 202 from understanding the incoming signal and responding to the signal. Using the H.323 protocol, the incoming streams of data can be decomposed by the second TCP/IP and H.323 termination unit 330 into video data, audio data, T.120 data, and configuration data. Once the videoconference data packets have been decomposed according to the H.323 protocol, the video data, audio data, T.120 data, and configuration data are sent through the multimedia firewall adapter 202 via their respective channels.

Before this data is transmitted through the multimedia firewall adapter 202, a communication link must be established between a conference caller and a conference recipient. After the incoming signal is decomposed according to the H.323 protocol, extracted information about the conference caller and conference recipient are transmitted across the multimedia firewall adapter 202 in order to establish a connection. Since the exemplary embodiment of the multimedia firewall adapter 202 of FIG. 3 does not include a gatekeeper, the address name and location of the conference recipient must be looked up in a gatekeeper (not shown) that is somewhere in the intranet 203. The gatekeeper provides the address of the destination party so that the call can be completed. Alternatively, if the multimedia firewall adapter 202 does comprise a gatekeeper, the multimedia firewall adapter 202 can determine the address name and location of the conference recipient.

Once the conference recipient address is verified and the incoming conference caller is determined to be authorized to make the call, the audio and video conference data is sent across the multimedia firewall adapter 202. The multimedia firewall adapter 202 controls set up and management of correct ports and configurations so that neither the conference caller nor the conference recipient need to be concerned with these matters.

The exemplary embodiment of FIG. 3 overcomes difficulties of conducting a videoconference across the conventional firewall 204 by allowing the audio and video data of the conference to flow around the conventional firewall 204 without compromising the conventional firewall 204 security. This embodiment allows the audio and video components to flow through uninterrupted, while the H.323 protocol blocks non-conforming signals thereby enforcing security.

Furthermore, since the audio and video data is only displayed or broadcasted and not processed, the chances for a security breach are limited.

Figure 4:
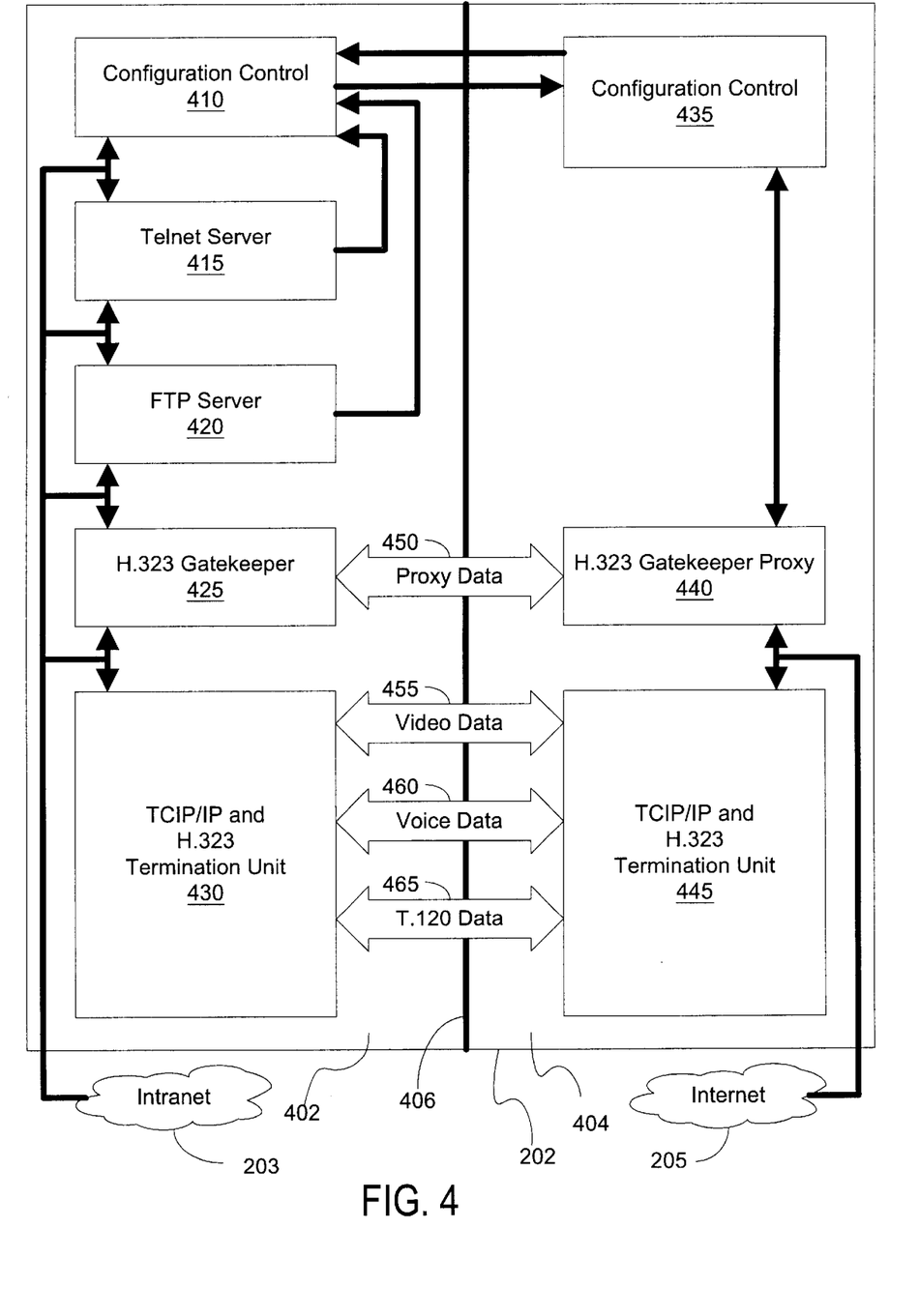
FIG. 4 is an exemplary block diagram showing elements of the multimedia firewall adapter of FIG. 2 in accordance with another embodiment of the invention.

FIG. 4 is an exemplary block diagram showing an alternative embodiment of the multimedia firewall adapter 202 comprising a H.323 gatekeeper 425 and a H.323 gatekeeper proxy 440. The multimedia firewall adapter 202 also includes an inside firewall adapter unit 402 and an outside firewall adapter unit 4(i)4 separated by a divider 406. Similar to the embodiment of FIG. 3, the divider 406 does not represent a real physical object and is only shown for illustrative purposes. The inside firewall adapter unit 402 further comprises a first configuration control 410, a telnet server 415, a file transfer protocol (ftp) server 420, the H.323 gatekeeper 425, and a first TCP/IP and H.323 termination unit 430. The outside firewall adapter unit 404 further comprises a second configuration control 435, the H.323 gatekeeper proxy 440, and a second TCP/EP and H.323 termination unit 445. Data is transferred between the inside firewall adapter unit 402 and the outside firewall adapter unit 404 through a gatekeeper proxy data channel 450, a video data channel 455, a voice data channel 460, and a T.120 data channel 465. In other embodiments of the invention, the ftp server 420 and/or the telnet server 415 are omitted.

The gatekeeper proxy data channel 450 transmits all user requests to the Internet 205 and directs responses back out to the appropriate users. Typically, the gatekeeper proxy data channel 450 transfers information such as destination address in an H.323 standard format independent of IP address or in addition to IP address. Similar to the embodiment of FIG. 3, the video data channel 455 only transfers video signals across the multimedia firewall adapter 202, the voice data channel 460 only transfers voice or audio signals across the multimedia firewall adapter 202, and the T.120 data channel 465 only transfers data conferencing signals as specified by ITU T.120 standard across the multimedia firewall adapter 202.

The inside firewall adapter unit 402 and the outside firewall adapter unit 404 are essentially independent of each other. Both the inside firewall adapter unit 402 and the outside firewall adapter unit 404 use hardware, firmware, and software which are completely isolated from each other except for the respective data transfer channels 450, 455, 460, and 465. This type of design enhances the firewall's security because conference data packets from the Internet 205 are processed with hardware, firmware, and software that are not directly connected to any part of the intranet 203.

The outside firewall adapter unit 404 decomposes and checks incoming data packets from the Internet 205, and only permits screened data or data which cannot cause harm to the intranet 203 (e.g., video and audio data that will only be displayed and not processed) to pass through to the intranet 203. Similarly,: data packets originating in the intranet 203 are processed with hardware, firmware, and software that are not directly connected to any part of the Internet 205. Once the Internet 205 and the intranet, 203 data packets are processed and decomposed with their respective hardware and software, the decomposed data is allowed to pass between the intranet 203 and the Internet 205 through the selected data channels 450, 455, 460, and 465.

Analysis of incoming signals by the outside firewall adapter unit 404 hardware, firmware, and software that are separate from the inside firewall adapter unit 402 hardware, firmware, and software significantly reduces the probability of unauthorized entry into the intranet 203 by a trespasser or virus because only voice, video, and T.120 data is allowed into the intranet 203 via the multimedia firewall adapter 202. If an incoming signal is analyzed by hardware, firmware, or software which is also used by the intranet 203, then a hacker, by definition, has gained access to the intranet 203 by sending a signal, and it is only a matter of writing clever code to circumvent security measures. When incoming signals are analyzed by hardware, firmware, and software which is separate from that used by the intranet 203 (i.e., in the outside firewall adapter unit 404), suspect data signals are not allowed anywhere near equipment or software for which the suspect data could damage. Therefore this isolation enhances security provided by the multimedia firewall adapter 202.

The first configuration control 410 and the second configuration control 435 are used to configure the inside firewall adapter unit 402 and the outside firewall adapter unit 404, respectively. The configuration controls 410 and 435 perform many functions including defining channels, updating addresses, controlling traffic, etc. The telnet server 415 is a terminal emulation protocol commonly used on the Internet 140 to emulate a terminal and Transmission Control Protocol/Internet Protocol (TCP/IP)-based networks that allows a user at a terminal or computer to log onto a remote device and run a program. The FTP server 420 and the telnet server 415, preferably, configure the multimedia firewall adapter 202.

The H.323 gatekeeper 425, which resides on the intranet 203 side of the multimedia firewall adapter 202, is a server that, among other functions, translates user names into physical addresses for H.323 conferencing and can provide call authorization and accounting information. The H.323 gatekeeper proxy 440, which resides on the Internet 205 side of the multimedia firewall adapter 202, is an application that breaks a connection between a sender and a receiver by forwarding input signals to a different port thereby closing a straight path between two networks (e.g., the Internet 205 and the, intranet 203). Thus, the H.323 gatekeeper proxy 440 can prevent a hacker from obtaining internal addresses and details of a private network, such as the intranet 203. In operation, the H.323 gatekeeper 425 receives a destination party address from the intranet 203 and transmits that address, via the gatekeeper proxy data channel 450, to the H.323 gatekeeper proxy 440 after the H.323 gatekeeper 425 has determined that the destination party is not located within the intranet 203. The gatekeeper proxy data channel 450 is used to transmit data packets which contain information about the destination party as well as the calling party. Subsequently, the H.323 gatekeeper proxy 440 acts on behalf of entities on one side of a firewall (e.g., intranet 203) to contact entities on the other side of the firewall (e.g., the Internet 205).

The first TCP/IP and H.323 termination unit 430 and the second TCP/IP and H.323 termination unit 445 reside on the inside portion (i.e., the inside firewall adapter unit 402) and the outside portion (i.e., the outside firewall adapter unit 404) of the multimedia firewall adapter 202, respectively, and are both used to decompose media (i.e., packets) from a videoconference stream. The first TCP/IP and H.323 termination unit 430 terminates and decomposes media originating from the intranet 203, whereas the second TCP/IP and H.323 termination unit 445 terminates and decomposes media coming from the Internet 205. The decomposed media (such as audio, video, and T.120 data) are allowed to pass through without the internal existence of a connection between the intranet 203 and the Internet 205. Therefore, the multimedia firewall adapter 202 overcomes the difficulty of conducting a videoconference across the conventional firewall 204 (FIG. 2) by allowing the videoconference data to flow around the conventional firewall 204 without compromising firewall security.

Figure 5:
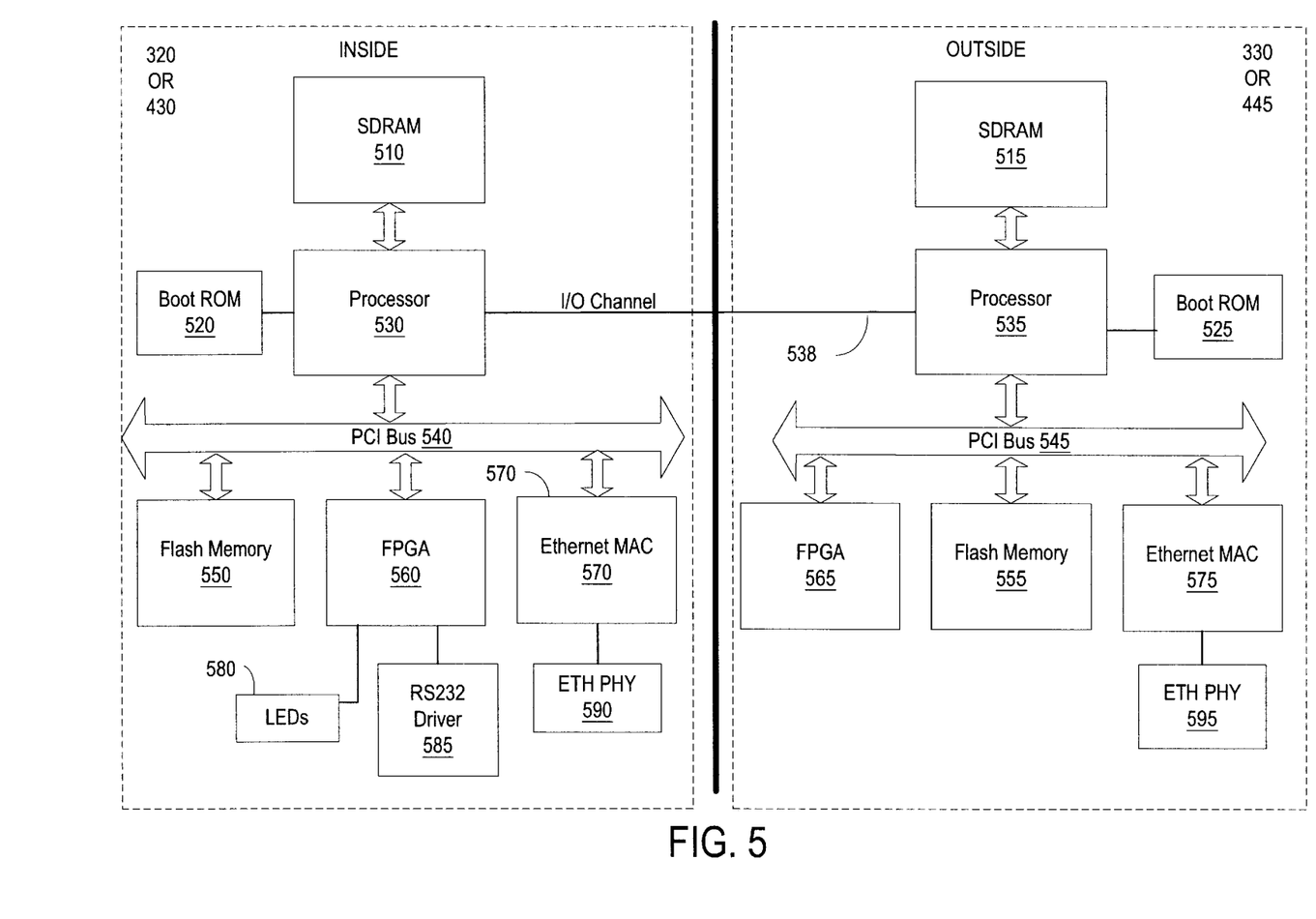
FIG. 5 is an exemplary block diagram showing TCIP/EP and H.323 termination units of the multimedia firewall adapter of FIG. 2 in accordance with one embodiment of the invention.

FIG. 5 is a detailed block diagram of exemplary embodiments of the TCIP/IP and H.323 termination units 320 (FIG. 3), 430 (FIG. 4), 330 (FIG. 3), and 445 (FIG. 4) of the multimedia firewall adapter 202 (FIG. 2). The exemplary embodiments comprise a first Synchronous Dynamic Random Access Memory (SDRAM) 510, a second SDRAM 515, a first boot Read Only Memory (ROM) 520, a second boot ROM 525, a first processor 530, a second processor 535, an I/O channel 538, a first Peripheral Component Interconnect (PCI) bus 540, a second PCI bus 545, a first flash memory 550, a second flash memory 555, a first Field Programmable Gate Array (FPGA) 560, a second FPGA 565, a first Ethernet Message Authentication Code (MAC) 570, a second Ethernet MAC 575, Light Emitting Diodes (LEDs) 580, a Recommended Standard (RS)-232 driver 585, a first Ethernet physical (PHY) layer interface 590, and a second Ethernet PHY layer interface 595. Alternative embodiments may not comprise all these devices, may comprise more devices, or similar functioning devices.

Although a detailed description of interactions between different components shown in FIG. 5 will be given below, a brief overall description of their interactions is first given here. As shown, the first PCI bus 540 exchanges data with the first flash memory 550, the first FPGA 560, the first Ethernet MAC 570, and the first processor 530. The first processor 530 further exchanges data with the first SDRAM 510. Similarly, the second PCI bus 545 exchanges data with the second flash memory 555, the second FPGA 565, the second Ethernet MAC 575, and the second processor 535. Data is further exchanged between the second processor 535 and the second SDRAM 515.

Exemplary inside TCIP/IP and H.323 termination units 320 or 430 and exemplary outside TCIP/IP and H.323, termination units 330 or 445 of the multimedia firewall adapter 202 communicate only through the I/O channel 538, which connects the first processor 530 to the second processor 535. In the embodiment of FIG. 5, the I/O channel may comprise the video data channel 340 (FIG. 3) or 455 (FIG. 4), the voice data channel 342 (FIG. 3) or 460 (FIG. 4), the T.120 data channel 344 (FIG. 3) or 465 (FIG. 4), and the media control channel 346 of FIG. 3 or the gatekeeper proxy data channel 450 of FIG. 4. Incoming data which enters through the second ethernet MAC 575 is transferred through the second PCI bus 545, processed by the second processor 535, and temporarily stored in the second SDRAM 515. Preferably, the second processor 535 uses H.323 protocol instructions stored in the flash memory 555 to decompose the incoming data. The decomposed data is also temporarily stored in the second SDRAM 515, which acts like a buffer.

Subsequently, the decomposed data (also referred to as a decomposed signal) is transferred to the first processor 530 through the I/O channel 538. Next, the first processor 530 reconstructs the decomposed signal according to the H.323 protocol saved in the first flash memory 550, thereby providing security by rejecting data not conforming with the H.323 protocol. The reconstructed data is then temporarily stored in the first SDRAM 510, which also serves as a buffer. Next, the data is transferred along the first PCI bus 540 to the first ethernet MAC 570 which in turn sends the recomposed data signals to an appropriate destination on the intranet 203 (FIG. 2).

For signals originating in the intranet 203 and sent to the Internet 205, the process is reversed. In this case, the first processor 530 decomposes an incoming signal and transfers the decomposed signal through the I/O channel 538 to the second processor 535. The second processor 535 reconstructs the signal and transfers the reconstructed signal to an appropriate destination on the Internet 205. Thus, the multimedia firewall adapter 202 uses the video data channel 340 or 455 and the voice data channel 342 or 460 within the I/O channel 538 to transfer video and audio data, thereby bypassing the conventional firewall 120 (FIG. 1) while maintaining security via the H.323 protocol.

Figure 6A:
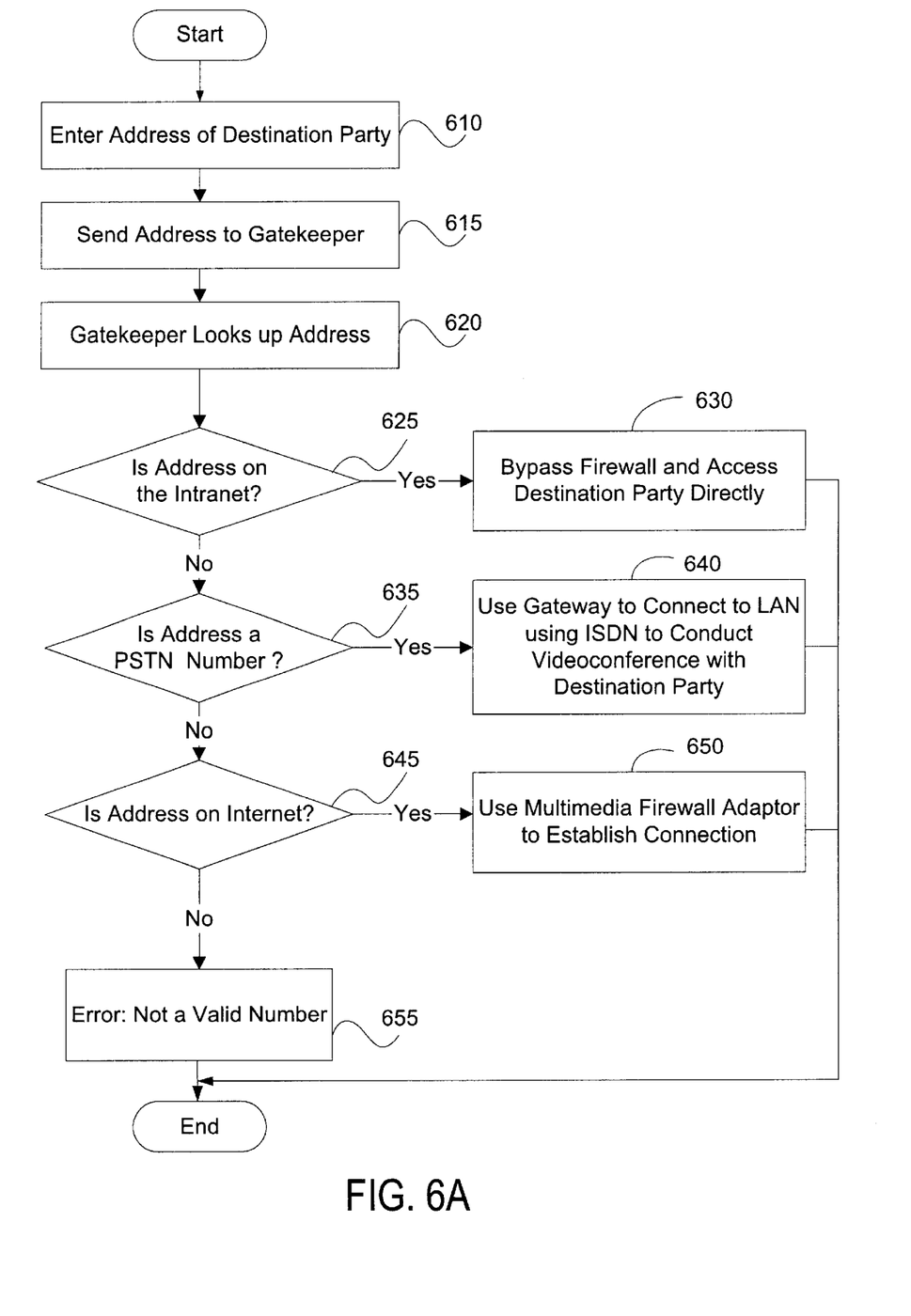
FIG. 6A is an exemplary flowchart of method steps for establishing a videoconference when the call originates in the intranet.

FIG. 6A is an exemplary flowchart of method steps to establish a videoconference connection originating from a conference caller located on the intranet 203 (FIG. 2) side of the multimedia firewall adapter 202 (FIG. 2). The conference caller first enters an address of a destination party (i.e., a conference recipient) in step 610. The address of the destination party can be a telephone number, an intranet address, or an Internet address. An example of an address is name@directory.company.com. Next in step 615, the gatekeeper 425 (FIG. 4) is requested to establish a connection with this address using a protocol such as H.323.

In step 620, the gatekeeper 425 looks up the address in a database. After the address has been retrieved from the database, a decision is made by the inside firewall adapter unit 302 or 402 (FIG. 3 or FIG. 4), in step 625, as to whether the entered address is an intranet address. If the address is an intranet address, then the inside firewall adapter unit 302 or 402 decides, in step 630, to cause corresponding videoconference data to bypass the conventional firewall 204 (FIG. 2) and the multimedia firewall adapter 202. The bypass allows the conference recipient to be accessed directly without the use of the multimedia firewall adapter 202. For example, if two videoconferencers, A and B, both work for the same company which has its own intranet 203, and A attempts to contact B for a videoconference, the inside firewall adapter unit 302 or 402 will determine that B's address is within the intranet 203 and will route the call directly to B without passing through either the conventional firewall 204 or the multimedia firewall adapter 202. However if, in step 625, the address of the conference recipient is not an intranet address, then the inside firewall adapter unit 302 or 402 passes control to the outside firewall adapter unit 304 or 404 (FIG. 3 or FIG. 4), and the method proceeds to optional step 635.

In optional step 635, another decision is made as to whether the entered address is a public switched telephone network (PSTN) number. If the outside firewall adapter unit 304 or 404 determines in step 635 that the entered address is a PSTN, then the multimedia firewall adapter 202, which is then connected to a local area network (LAN), makes a connection over an Integrated Services Digital Network (ISDN) and establishes the videoconference in step 640. With the PSTN address, the videoconference in this embodiment is conducted via a gateway connected to the LAN using ISDN to the call recipient.

However, if the outside firewall adapter unit 304 or 404 determines that the address of the destination party is not a PSTN number in step 635, then another decision is required. The outside firewall adapter unit 304 or 404 must determine in step 645 whether the entered address is on the Internet 205. If the outside firewall adapter unit 304 or 404 determines that the entered address is an Internet address, then the multimedia firewall adapter 202 is used to establish a connection in step 650. The details of step 650 are further discussed in FIG. 6B. However, if the outside firewall adapter unit 304 or 404 determines, in step 645, that the entered address is not an Internet address, then the entered address is deemed to be invalid and an error message indicating an invalid number is returned by the multimedia firewall adapter 202 in step 655.

Figure 6B:
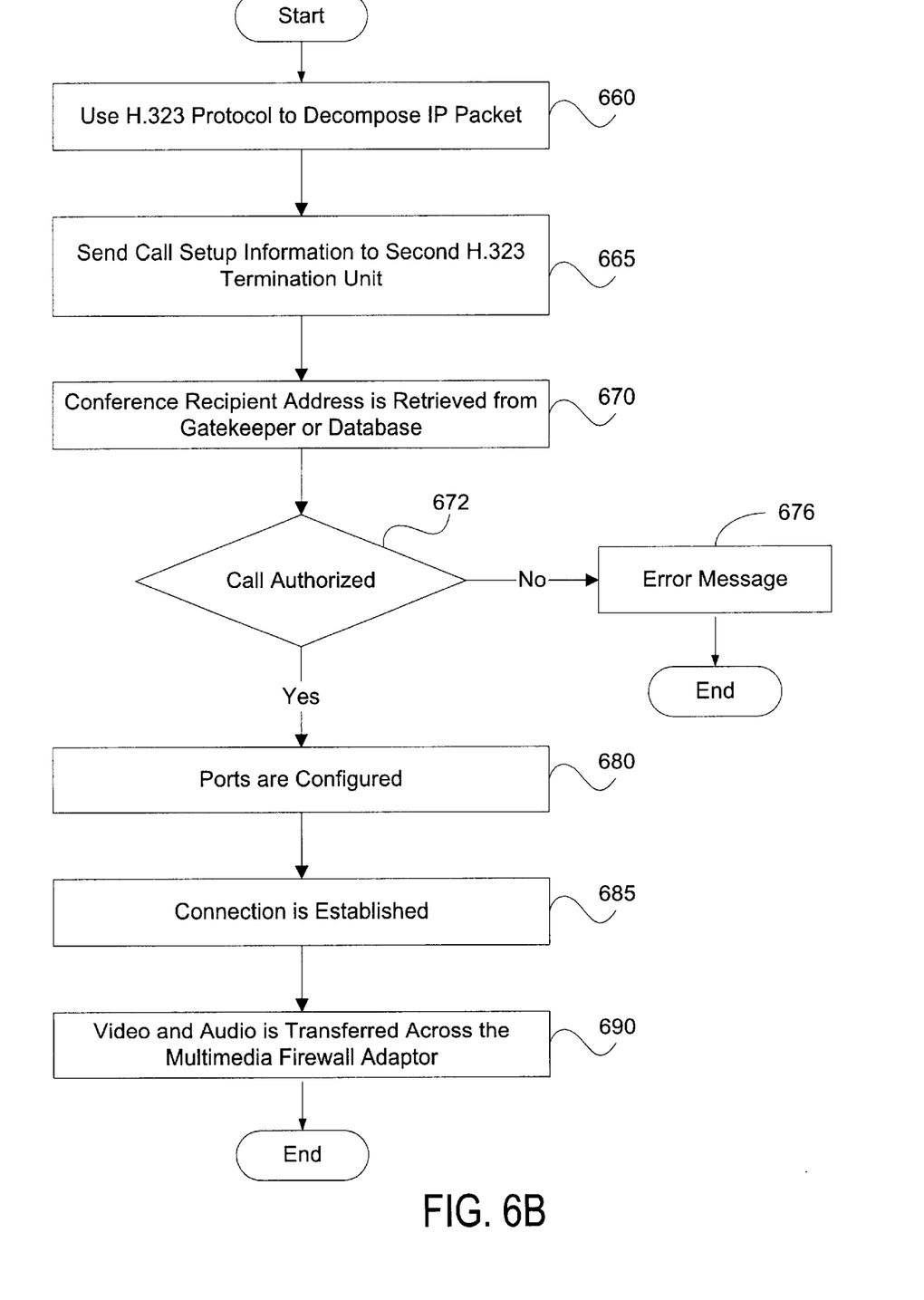
FIG. 6B is an exemplary flowchart of method steps for using the multimedia firewall adapter of FIG. 2 to establish a connection.

FIG. 6B is an exemplary flow diagram showing method steps of establishing a connection using the multimedia firewall adapter 202 (FIG. 2) when the conference recipient resides on the Internet 205 (FIG. 2). First in step 660, the multimedia firewall adapter 202 uses the H.323 protocol to decompose an IP packet from the intranet 203, into components including video data, audio data, and configuration data. Next in step 665, call setup information extracted from the configuration data is sent through the!multimedia firewall adapter 202 to the second TCIP/IP and H.323 termination unit 330 or 445 (FIG. 3 or FIG. 4). Then, in step 670, the conference recipient address is looked up and retrieved from the gatekeeper 425 (FIG. 4) or a database (not shown but typically residing on the intranet 203 (FIG. 2) side of the multimedia firewall adapter 202). A decision is then made by the multimedia firewall adapter 202, in step 672, as to whether the conference caller is authorized to call the conference recipient. If the conference caller is not authorized to make the call, an error message is sent by the multimedia firewall adapter 202 to the conference caller and the call is terminated in step 676.

However, if the conference caller is authorized to make the call then, in step 680, the multimedia firewall adapter 202 undergoes a configuration process comprising selecting ports (not shown) on both sides of the multimedia firewall adapter 202 and matching the selected ports on the inside firewall adapter unit 302 (FIG. 3) or 402 (FIG. 4) with the selected ports on the outside firewall adapter unit 304 (FIG. 3) or 404 (FIG. 4). These ports will be used to transfer videoconference video and audio data across the multimedia firewall adapter 202. Next, in step 685, a connection between the conference caller and conference recipient is established and verified by the multimedia firewall adapter 202. Finally, in step 690, audio and video data that has been extracted from incoming IP packets are allowed to flow freely across the multimedia firewall adapter 202 through the ports configured in step 680.

Figure 7:
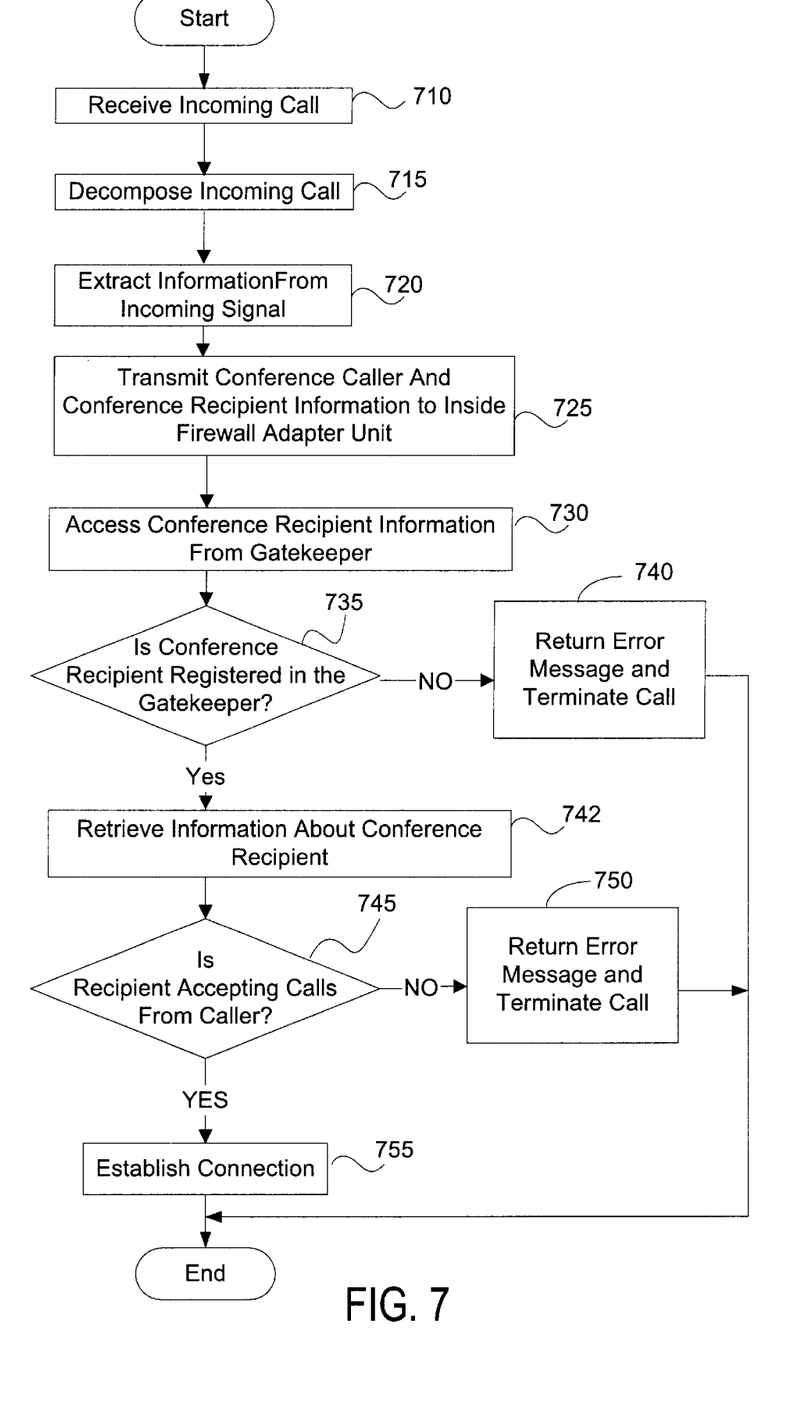
FIG. 7 is an exemplary flowchart of method steps method for establishing a videoconference when the call originates in the Internet.

FIG. 7 is an exemplary flow diagram of method steps undertaken by the multimedia firewall adapter 202 (FIG. 2) when receiving an incoming Internet 205 (FIG. 2) call, and establishing a videoconference connection. A caller originating a call from somewhere on the Internet 205 makes contact with the multimedia firewall adapter 202 by first entering the correct address of the destination party and allowing the intranet 203 (FIG. 2) and the Internet 205 infrastructure to establish a connection. Once the connection is established, the incoming call is first received, in step 710, by the second TCP/IP and H.323 termination unit 330 or 445 (FIG. 3 or FIG. 4) which is part of the outside firewall adapter unit 304 or 404 (FIG. 3 or FIG. 4). Next, in step 715, the incoming call is decomposed (i.e., incoming packets are decomposed) by the second TCP/IP and H.323 termination unit 330 or 445 in accordance with the H.323 protocol. In step 720, information such as conference caller identification, conference recipient identification, video stream, audio stream, and data stream is extracted from the incoming call (also referred to as an incoming signal) by the outside firewall adapter unit 3()4 or 404. In step 725, the extracted conference recipient name and conference caller identification is forwarded to the inside firewall adapter unit 302 or 402 (FIG. 3 or FIG. 4) through the media control channel 346 (FIG. 3) or gatekeeper proxy data channel 450 (FIG. 4). Next in step 730, the conference recipient information is accessed from the gatekeeper 425 (FIG. 4) or a database (not shown).

Subsequently, in step 735, a decision is made by the first TCP/IP and H.323 termination unit 320 or 430 (FIG. 3 or FIG. 4) as to whether the conference recipient is registered in the gatekeeper 425 or database (not shown). If the name is not registered in the database, an error message from the multimedia firewall adapter 202 indicating an invalid destination party is delivered to the conference caller, and the call is terminated by the second TCP/IP and H.323 termination unit 330 or 445 in step 740. However, if the call recipient name is registered in the database, then information associated with the call recipient name is retrieved from the database by the multimedia firewall adapter 202 in step 742.

Next, in step 745, the first TCP/IP and H.323 termination unit 320 or 430 determines whether the conference recipient is accepting calls from the conference caller. This determination is conducted by comparing the identity of the conference caller with a list of authorized callers. If the conference caller is not authorized to call the conference recipient, an error message indicating that the conference caller is not authorized to make this call is sent to the conference caller, and the call is terminated by the second TCP/IP and H.323 termination unit 330 or 445 in step 750. Otherwise, a connection is established in step 755, and video and audio streams are allowed to pass through the multimedia firewall adapter 202 from the Internet 205 to the intranet 203 via the various data channels in the multimedia firewall adapter 202. The inside firewall adapter unit 302 or 402 of the multimedia firewall adapter 202 then reassembles the decomposed packets according to the H.323 protocol.

This process of!decomposing an incoming signal and then reconstructing the signal by reassembling the decomposed packets is similar to the process described in connection with FIG. 6B for a signal originating on the intranet 203 side of the multimedia firewall adapter 202 and going to a conference recipient on the Internet 205. However, as illustrated in the FIG. 7 method steps, the signal is decomposed on the Internet 205 side of the multimedia firewall adapter 202 and reassembled (i.e., recomposed) on the intranet 203 side.

It will also be recognized by those skilled in the art that, while the invention has been described above in terms of exemplary embodiments, it is not limited thereto. Various features and aspects of the above-described invention may be used individually or jointly. Further, although the invention has been described in the context of implementation in a particular environment and for particular applications, those skilled in the art will recognize that its usefulness is not limited thereto and that the present invention can be utilized in any number of environments and implementations. For example, while the embodiments of the present invention were described utilizing an H.323 protocol, other protocols may be utilized. As a further example, the present invention may be utilized in an audio conference system. Therefore, these and other variations upon the specific embodiments are intended to be covered by the present invention.

What is claimed is:

1. A method for conferencing across networks separated by a firewall, comprising the steps of:

receiving an incoming data signal at a multimedia firewall adapter;

decomposing the incoming data signal according to a protocol;

authenticating the decomposed incoming data signal according to the protocol;

allowing the decomposed incoming data signal to pass through the multimedia firewall adapter if the decomposed incoming data signal is authenticated to contain conferencing data; and blocking the incoming data signal from passing through the multimedia firewall adapter if the decomposed incoming data signal is not authenticated to contain conferencing data.

2. The method of claim 1, further comprising the step of recomposing the decomposed incoming data signal passed through the multimedia firewall adapter.

3. The method of claim 1, further comprising the step of sending the blocked incoming data signal to a conventional firewall for analysis.

4. The method of claim 1, wherein the incoming data signal is from an intranet.

5. The method of claim 1, wherein the incoming data signal is from an Internet.

6. The method of claim 1, wherein the protocol is a H.323 protocol.

7. The method of claim 1, wherein the conferencing data is video data.

8. The method of claim 1, wherein the conferencing data is audio data.

9. The method of claim 1, wherein the conferencing data is T.120 data.

10. The method of claim 1, wherein the conferencing data is configuration data.

11. A method for conducting a conference across networks separated by a firewall, comprising the steps of:

receiving an incoming conferencing signal at a multimedia firewall adapter from a conference caller;

decomposing the incoming conferencing signal into conferencing data;

passing the conferencing data through the multimedia firewall adapter;

recomposing the incoming conferencing signal from the conferencing data; and sending the recomposed conferencing signal to a conference recipient.

12. The method of claim 11, wherein the conferencing data comprises configuration data used to used to configure the multimedia firewall adapter.

13. The method of claim 11, further comprising the step of extracting call recipient information from the conferencing data.

14. The method of claim 13, further comprising the step of sending the call recipient information through the multimedia firewall adapter to establish a connection between the conference caller and the conference recipient.

15. The method of claim 11, further comprising the step of retrieving call recipient information from a gatekeeper based upon the conferencing data.

16. The method of claim 11, further comprising the step of blocking a non-conference signal received at the multimedia firewall adapter from passing through the multimedia firewall adapter.

17. The method of claim 11, further comprising the step of sending a non-conference signal received at the multimedia firewall adapter to a conventional firewall for further analysis.

18. A system for conferencing across networks separated by a firewall, comprising:

an inside multimedia firewall adapter unit coupled to an intranet for decomposing conferencing signals from the intranet according to a protocol;

an outside multimedia firewall adapter unit coupled to an Internet for decomposing conferencing signals from the Internet according to the protocol; and a plurality of data channels coupling the inside multimedia firewall adapter unit to the outside multimedia firewall adapter unit.

19. The system of claim 18, wherein the inside multimedia firewall adapter unit is configured to recompose the decomposed conferencing signals received from the outside multimedia firewall adapter unit, and send the recomposed; signals onto the intranet.

20. The system of claim 18, wherein the outside multimedia firewall adapter unit is configured to recompose the decomposed conferencing signals received from the inside multimedia firewall adapter unit, and send the recomposed signals onto the Internet.

21. The system of claim 18, wherein a data channel of the plurality of data channels is a video data channel.

22. The system of claim 18, wherein a data channel of the plurality of data channels is a voice data channel.

23. The system of claim 18, wherein a data channel of the plurality of data channels is a T.120 data channel.

24. The system of claim 18, wherein a data channel of the plurality of data channels is a media control channel.

25. The system of claim 18, wherein the inside multimedia firewall adapter unit and the outside multimedia firewall adapter unit are in the firewall.

26. The system of claim 18, wherein the inside multimedia firewall adapter unit comprises a first TCIP/IP and termination unit for decomposing the conferencing signals from the intranet.

27. The system of claim 18, wherein the outside firewall adapter unit comprises a second TCIP/IP and termination unit for decomposing the conferencing signals from the Internet.

28. The system of claim 18, wherein the inside multimedia firewall adapter unit further comprises a gatekeeper for retrieving addresses and call authorization.

29. The system of claim 28, wherein the outside multimedia firewall adapter unit further comprises a gatekeeper proxy coupled to the gatekeeper via a proxy data channel for preventing an Internet user direct access to the intranet.

30. The system of claim 18, wherein the outside multimedia firewall adapter unit further comprises a second configuration control for configuring the outside multimedia firewall adapter unit.

31. The system of claim 18, wherein the inside multimedia firewall adapter unit further comprises a first configuration control for configuring the inside multimedia firewall adapter unit.

32. An electronic-readable medium, having embodied thereon a program, the program being executable by a machine to perform method steps for conferencing across networks separated by a firewall, the method steps comprising:

receiving an incoming data signal at a multimedia firewall adapter;

decomposing the incoming data signal according to a protocol;

authenticating the decomposed incoming data signal according to the protocol;

allowing the decomposed incoming data signal to pass through the multimedia firewall adapter if the decomposed incoming data signal is authenticated to contain conferencing data; and blocking the incoming data signal from passing through the multimedia firewall adapter if the decomposed incoming data signal is not authenticated to contain conferencing data.

33. The electronic-readable medium of claim 32, further comprising the step of recomposing the decomposed incoming data signal passed through the multimedia firewall adapter.

34. The electronic-readable medium of claim 32, further comprising the step of sending the blocked incoming data signal to a conventional firewall for analysis.

35. A system for conferencing across networks separated by a firewall, comprising:

means for receiving an incoming data signal at a multimedia firewall adapter;

means for decomposing the incoming data signal according to a protocol;

means for authenticating the decomposed incoming data signal according to the protocol;

means for allowing the decomposed incoming data signal to pass through the multimedia firewall adapter if the decomposed incoming data signal is authenticated to contain conferencing data; and means for blocking the incoming data signal from passing through the multimedia firewall adapter if the decomposed incoming data signal is not authenticated to contain conferencing data.

* * * * *